United States Patent
Coleman (10) Patent No.: US 11,807,562 B2
(45) Date of Patent: Nov. 7, 2023

(54) BIOLOGICAL PHOSPHORUS AND NITROGEN REMOVAL IN ACTIVATED SLUDGE PROCESSING

(71) Applicant: DENTRO-P, LLC, Yakima, WA (US)

(72) Inventor: Thomas E. Coleman, Yakima, WA (US)

(73) Assignee: DENTRO-P, LLC, Yakima, WA (US)

(*) Notice: Subject to any disclaimer, the term of this patent is extended or adjusted under 35 U.S.C. 154(b) by 0 days.

(21) Appl. No.: 17/674,755

(22) Filed: Feb. 17, 2022

(65) Prior Publication Data

US 2022/0259084 A1 Aug. 18, 2022

Related U.S. Application Data (60) Provisional application No. 63/150,281, filed on Feb. 17, 2021.

(51) Int. Cl.
| | | |
|---|---|---|
| *C02F 3/30* | (2023.01) | |
| *C02F 3/12* | (2023.01) | |
| *C02F 3/34* | (2023.01) | |
| *C02F 101/16* | (2006.01) | |
| *C02F 101/10* | (2006.01) | |

(52) U.S. Cl.
CPC ............ *C02F 3/308* (2013.01); *C02F 3/1215* (2013.01); *C02F 3/1257* (2013.01); *C02F 3/341* (2013.01); *C02F 2101/105* (2013.01); *C02F 2101/163* (2013.01); *C02F 2101/166* (2013.01); *C02F 2209/006* (2013.01); *C02F 2209/04* (2013.01); *C02F 2209/22* (2013.01); *C02F 2209/44* (2013.01); *C02F 2301/08* (2013.01)

(58) Field of Classification Search
CPC ...... C02F 3/308; C02F 3/1215; C02F 3/1257; C02F 3/341; C02F 2101/105; C02F 2101/163; C02F 2101/166; C02F 2209/006; C02F 2209/04; C02F 2209/22; C02F 2209/44; C02F 2301/08; C02F 3/006; C02F 3/302
USPC ....................................................... 210/605
See application file for complete search history.

(56) References Cited

U.S. PATENT DOCUMENTS

| | | | | |
|---|---|---|---|---|
| 8,568,592 | B2 * | 10/2013 | Coleman ................. | C02F 3/006 210/906 |
| 2021/0403353 | A1 * | 12/2021 | Coleman ................. | C02F 3/308 |

OTHER PUBLICATIONS

Specific Volume Definition, see https://web.archive.org/web/20210216021325/https://sciencenotes.org/specific-volume-definition-and-examples/, Feb. 16, 2021 (Year: 2021).*

* cited by examiner

*Primary Examiner* — Ekandra S. Miller-Cruz
(74) *Attorney, Agent, or Firm* — Svendsen Legal, LLC (57) ABSTRACT

An activated sludge process for the treatment of municipal wastewater, particularly applicable to oxidation ditch activated sludge treatment systems which utilize a conventional race track or continuous loop reactor basin configuration. The process removes phosphorus and nitrogen from an activated sludge wastewater treatment system, with an anoxic cycle followed by an aerobic cycle, and followed by a surface wasting cycle until a low flow diurnal period is reached in a diurnal or twenty-four hour period. Automated microprocessor control system using "oxidation-reduction potential" (ORP) and "dissolved oxygen" (DO) as process variable inputs automate aerated and anoxic cycles to optimize phosphorus and nitrogen removal using the available carbon in the influent wastewater resulting in an energy efficient dynamic dissolved oxygen control during the aerated periods.

16 Claims, 7 Drawing Sheets

"Modified Ludzack-Ettinger Process" Flow Schematic [Prior Art]

"Modified Bardenpho Process" Flow Schematic [Prior Art]

Metabolism of phosphorus accumulating organisms (PAOs) under anaerobic and oxic conditions, from Smolders et al (1994) [Prior Art]

LO-dOx™ Process for an Oxidation Ditch

Figure 5

Process Control Logic Diagram for a Continuous Flow Nutrient Removal System using In-line Fermentation

Figure 7

BIOLOGICAL PHOSPHORUS AND NITROGEN REMOVAL IN ACTIVATED SLUDGE PROCESSING

TECHNICAL FIELD

The present disclosure relates to and is applicable to the treatment of municipal wastewater by an activated sludge process. It is particularly applicable to oxidation ditch activated sludge treatment systems, which utilize a conventional "race track" or continuous loop reactor basin configuration, but may be applied to other activated sludge process configurations with similar benefits, as described herein.

BACKGROUND OF THE INVENTION

Conventional oxidation ditch activated sludge treatment systems typically utilize a "race track" or continuous loop reactor basin configuration in activated sludge wastewater treatment systems, and have been used for many years. These well known prior systems serve to eliminate the "biochemical oxygen demand" (BOD) from a municipal wastewater. The typical activated sludge treatment process they employ consists of an aeration basin containing a liquid suspension of microorganisms, referred to as a "mixed liquor". The wastewater is fed to the aeration basin and oxygen is utilized by the biomass to absorb, assimilate and metabolize the BOD available in the wastewater.

From the aeration basin, the mixed liquor flows to a clarifier, where the biomass settles and treated wastewater overflows. Most of the settled biomass is returned to the aeration basin, with a smaller portion discharged in order to maintain a relatively constant level of biomass in the system.

Oxidation ditch activated sludge systems offer cost-effective wastewater treatment for small municipalities, and hundreds of such plants exist in the United States and around the world today. Again, the process is characterized by an aeration basin that has an oval or racetrack configuration with unidirectional channel flow at sufficient velocity to maintain suspension and mixing of the biological solids or "mixed liquor suspended solids" (MLSS).

Various types of mechanical equipment have been used in oxidation ditches to provide mixing and aeration. The most commonly used aeration systems include a brush rotor aerator, which rotates partially submerged across the width of the channel, and also a low speed surface aerator located at the end of a dividing wall, as in a "carrousel" type of system. More recently, diffused aeration grids coupled with horizontal flow mixers have been used instead of brush rotors and other surface aeration systems.

Other unique features of an oxidation ditch and similar extended aeration activated sludge treatment systems as compared to other conventional sludge treatment systems are:

1. Long time periods of a solids retention time of 15 days to 30 days, and a hydraulic detention time of 18 hours to 24 hours;
2. Simplified plant flows, lacking a primary clarification and anaerobic digestion; and
3. The use of conservatively designed secondary clarifier loadings.

These features result in a system that is easy to operate, provides a high-quality effluent in terms of BOD and suspended solids, can handle variable loads well, and is economical for moderate and small size plants. Other extended aeration activated sludge systems include similar design features but may utilize various different aeration basin geometries and aeration and mixing systems.

Nitrogen removal in oxidation ditch and other activated sludge systems is a function of the system design, plant loading, operational method, and aerator control method. Typical nitrogen removal efficiencies range from 60% to 85%, with aeration control and operational methods having a significant influence on performance.

Also, it is known that these channel flow systems may be operated to enhance nitrogen removal by carefully controlling "dissolved oxygen" (DO) levels in the basin. As the channel flow leaves the aeration zone in the oxidation ditch, the DO concentration decreases until it is depleted, and anoxic zones occur in the ditch where nitrate is used instead of DO to accomplish nitrogen removal. The location and size of these anoxic zones will vary with time due to diurnal loading changes and will also depend on the average plant loading and design conditions. Consistent nitrogen removal by this method requires a comprehensive DO control system that includes channel DO measurements and a means to vary the aerator energy output.

The latter is accomplished conventionally by using two-speed motors, variable speed motors, variable level weirs, or diffused air grids coupled with variable speed aeration blowers. Under low loading conditions, it is very difficult, if not impossible, to accomplish nitrogen removal by this known method using mechanical surface aeration and mixing alone since, for such designs, some aeration is needed to maintain channel flow. Variable nitrogen removal levels are obtained, and vigilant control is needed to maximize performance. Nitrate consumption with this method is driven by the endogenous respiration rate of the channel mixed liquor, and not by the consumption of the influent BOD and is therefore has slower reaction rates and lower denitrification efficiency.

Another approach used to accomplish nitrogen removal with oxidation ditches and other activated sludge systems is to build an external anoxic tank ahead of the oxidation ditch for contacting the influent wastewater with nitrate containing mixed liquor pumped forward from the aeration basin. Such an approach is often referred to as the "Modified Ludzack-Ettinger Process" or MLE Process, as depicted in prior art FIG. 1, herein. This prior method provides consistent reliable nitrogen removal with its efficiency generally being a function of the mixed liquor internal recycle rate. However, the system requires a greater capital expenditure for the external anoxic tank and pumping system, as well as related energy costs for pumping and mixing in the anoxic tank.

Bulking sludge control in oxidation ditch and other extended aeration activated sludge systems is difficult in that they generally develop poor settling sludge, as indicated by high "sludge volume index" (SVI) values. The SVI is the volume (in mL) occupied by one gram of sludge after 30 minutes of settling of a 1.0 liter or 2.0 liter mixed liquor sample. High SVI values are usually associated with significant levels of filamentous bacteria within the activated sludge flocculent or "floc". Oxidation ditch systems are typically operated with low organic loadings, and it has been found that such operating conditions lead to the development of a filamentous bacteria population. Filamentous bacteria have greater ability to scavenge organic substrates or oxygen, and thus they have an advantage in low loaded systems where substrate concentrations are minimal.

Many prior design and operating strategies have been employed that can select against the development of filamentous bacteria, where conditions in the "selector" tanks allow the non-filamentous bacteria to capture a large proportion of the incoming BOD, so that the non-filamentous bacteria grow instead of filamentous organisms.

One such method establishes anoxic conditions during the initial contact between the influent wastewater and the mixed liquor. Filamentous bacteria are ineffective in using nitrate for oxidation of the incoming BOD as compared to non-filamentous bacteria, and thus do not proliferate under such conditions. This commonly accepted method places an anoxic tank ahead of the aeration tank, with a high mixed liquor recycle rate from the aeration basin to the anoxic basin. However, the disadvantages of this system were described above pertaining to its use for nitrogen removal.

"Oxygen-Reduction Potential" (ORP) is a measurement of the ratio of oxidants to reductants in a system. For biological systems, ORP values are lower and become negative as oxygen is removed and nitrate is consumed. It has been shown that the change in ORP versus time could be used to determine when oxygen and nitrate were depleted after stopping aeration during operation of an aerobic sludge digester.

During depletion of oxygen or nitrate, distinct changes in the slope of ORP versus time are observed, with nitrogen removal improved during operation of bench-scale aerobic digesters with ORP control, versus the use of a timer to turn the digester aeration on and off. The detection of nitrate depletion using the rate of change in the measured ORP value has been previously demonstrated in oxidation ditch systems to automatically control aerated and anoxic cycles to optimized nitrogen removal, improve SVI, reduce energy consumption, and recovery alkalinity. This use of ORP in this manner as a process control variable in an oxidation ditch is prior art as described in U.S. Pat. No. 5,582,734, and as illustrated in Metcalf & Eddy (5th Edition) as the dNOx® brand of ORP control process.

There is a need for phosphorus removal in addition to nitrogen removal in sludge treatment systems. Human activities can accelerate the rate at which nutrients enter ecosystems. Phosphorus (P) is often the limiting nutrient in cases of eutrophication in lakes and rivers subjected to runoff and/or point source pollution from wastewater treatment plants. At the same time, phosphate rock from which P fertilizers are produced is a non-renewable resource which is being rapidly depleted. More effective process control systems will help to promote the maximum use of "enhanced biological phosphorus removal" (EBPR) where chemical precipitation for P removal might otherwise be used. This is also important because P can be recovered as a by-product of EBPR systems for beneficial use as fertilizer, while P from chemical precipitates removed using metal salts cannot be effectively recovered.

Also, it is becoming increasingly common for regulatory agencies to impose limits on phosphorus as well as nitrogen on discharges from wastewater treatment plants. In a conventional biological nitrogen removal (BNR) wastewater treatment plant, nitrogen removal is achieved through nitrification and denitrification. Nitrification is the oxidation of ammonium to nitrate, catalyzed by bacteria, and is regarded as a key part of global nitrogen cycling. Denitrification is the biological reduction of nitrite and nitrate to nitrogen gas by heterotrophic bacteria consuming organic carbon in the absence of oxygen (defined as an anoxic condition).

In the first step of nitrification, chemolithoautotrophic ammonia-oxidizing bacteria (AOB) oxidize ammonium to nitrite. Nitrite is subsequently oxidized to nitrate by the "nitriteoxidizing bacteria" (NOB).

$$2NH_4^+ + 3O_2 \rightarrow 2NO_2^- + 4H^+ + 2H_2O$$

$$2NO_2^- + O_2 \rightarrow 2NO_3^-$$

The basic engineering principles for the design of P and N removal treatment facilities have been well established and have been implemented in various known configurations including, the "Modified Bardenpho Process", the "UCT Process", and the "$A_2O$ Process". The Modified Bardenpho Process configuration is shown schematically in prior art FIG. 2, herein. All of these prior processes include one or more anaerobic zones, followed by one or more anoxic zones and one or more aerobic zones. The only systems that would not include an anoxic zone would be those that are not required to, and do not nitrify. For all others, it is imperative that any return activated sludge or mixed liquor be denitrified before being returned to the anaerobic zone.

When nitrate or oxygen is discharged to the anaerobic zone, two things may happen, both of which are undesirable:

1. They will prevent fermentation of rbCOD to acetic and propionic acid; and
2. Nitrates or DO could serve as electron acceptors for "phosphate accumulating organisms" (PAOs) and other organisms that will metabolize the VFA and so deprive the PAOs of the substance that they need to store for growth and phosphorus removal.

Therefore, the modified Bardenpho and other similar processes utilize internal recycle streams such that minimal nitrate or DO is returned to the anaerobic zone. These pumped recycle stream flow rates must be carefully regulated to assure that the desired process objectives are achieved. These types of EBPR facilities are more complex than conventional activated sludge plants in terms of operation and control and are more expensive to construct, operate, and maintain. Because of the added cost and complexity of multi-stage phosphorus and nitrogen removal systems, many WWTPs, particularly smaller plants less than 5 MGD, have up to now often elected to utilize chemical precipitation instead when needed to meet permit requirements for phosphorus removal.

Organic carbon in the wastewater to be treated is critical for driving biological denitrification and EBPR. Sufficient organic carbon in the form of "readily biodegradable chemical oxygen demand" (rbCOD) is necessary for denitrifying bacteria to carry out denitrification. To achieve enhanced biological phosphorus removal (EBPR) as depicted schematically herein, in prior art FIG. 3, it is necessary to provide the PAOs with adequate supply of rbCOD in form of "volatile fatty acids" (VFAs) and appropriate anaerobic conditions free of nitrates.

Thus, there is a competition for the available rbCOD between PAOs and denitrifying bacteria. When influent wastewater has a lower concentration of organic carbon the nutrient removal efficiency decreases, or an external source of carbon needs to be added. In order to solve the problem of competition for the limited organic substrate, "denitrifying phosphorus accumulating organisms" (dnPAOs) have received considerable.

Figure 3:
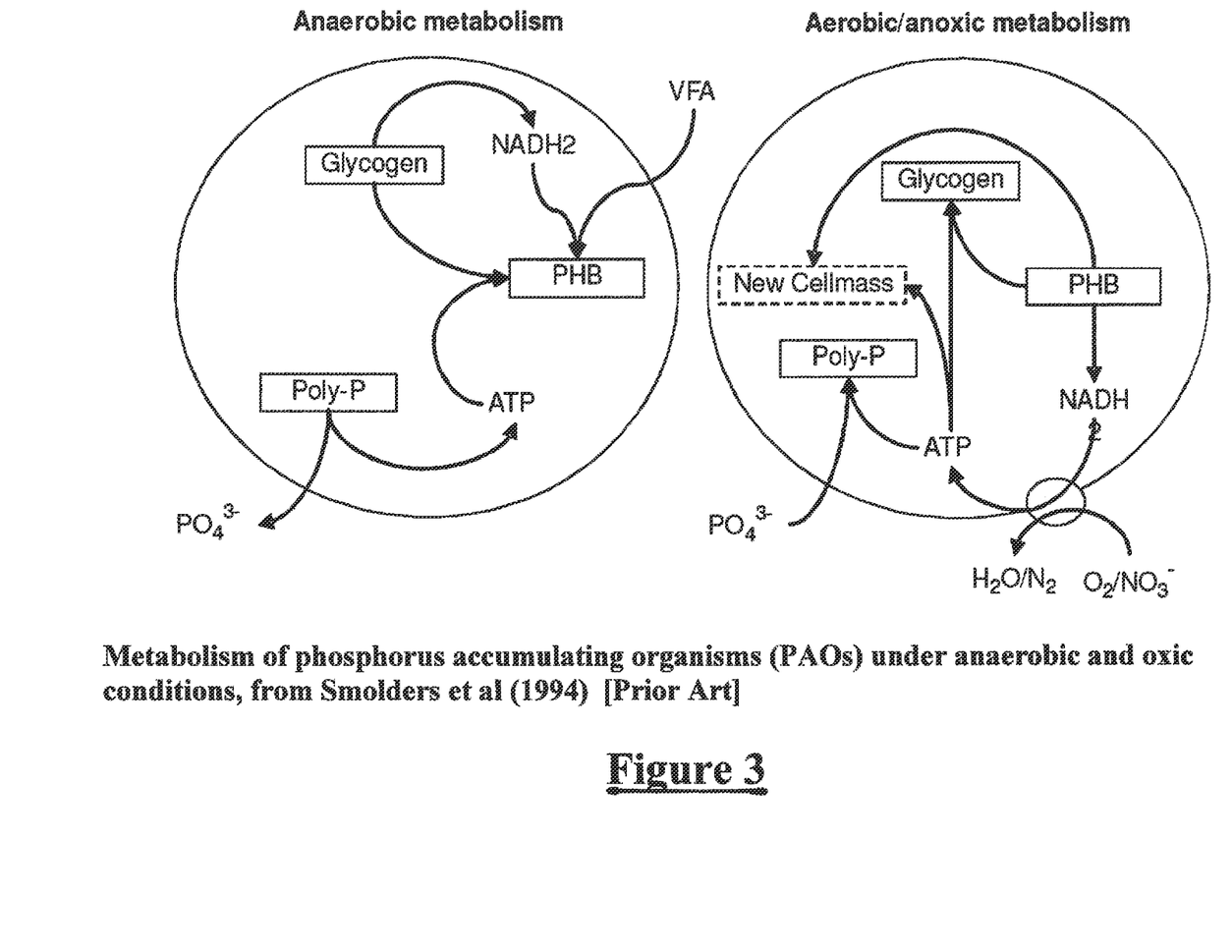
FIG. 3 is a prior art schematic diagram illustrating the metabolism of phosphorus accumulating organisms (PAOs) under anaerobic and oxic conditions.

The dnPAOs are distinguished from "aerobic phosphorus accumulating organisms" (aPAOs) by their unique metabolic characteristics. The mechanism of anaerobic phosphate release of dnPAOs is the same as that of aPAOs. As depicted in FIG. 3, external organic substrate is taken up and converted to polyhydroxyalkanoate (PHA) as a cell energy storage product. Phosphorus is taken up under aerobic conditions by aPAOs, as shown in prior art FIG. 3, but uptake can also occur under anoxic conditions by dnPAOs.

The denitrifying ability of dnPAOs is a key factor in EBPR process designs for simultaneous denitrification and P removal that can lead to savings in plant operational costs. dnPAOs can combine phosphorus removal and denitrification into one process using the same amount of organic carbon substrate. In addition, less aeration is needed which translates into lower energy requirements. Thus, the advantage of selecting for dnPAOs over aPAOs by means of reactor configuration and/or control strategies is very significant.

Many previous investigations have demonstrated that successful EBPR has been achieved using nitrate as a final electron acceptor, it has been suggested that "*Candidatus* Accumulibacter phosphatis" (*Ca*. Accumulibacter) clades may have the ability to take up P using nitrate. However in recent research, it was shown that all *Ca*. Accumulibacter clades failed to take up phosphorus using nitrate in a diluted sludge with a lack of sufficient nitrate reduction capability, while *Ca*. Accumulibacter clades successfully took up phosphorus using nitrite as the final electron acceptor.

These results were in accordance with previous results showing the absence of nitrate reductase and the presence of nitrite reductase in the *Ca*. Accumulibacter metagenome. This observation becomes a very important factor in developing process control strategy to select for dnPAOs over aPAOs.

BRIEF DESCRIPTION OF THE DRAWINGS

Exemplary embodiments of the technology will become more fully apparent from the following descriptions and appended claims, taken in conjunction with the accompanying drawings. Understanding that these drawings depict only exemplary embodiments and are, therefore, not to be considered limiting of the scope of the technology, the exemplary embodiments will be described with additional specificity and detail through use of the accompanying drawings in which:

Reference characters included in the above drawings indicate corresponding parts throughout the several views, as discussed herein. The description herein illustrates one preferred embodiment of the invention, in one form, and the description herein is not to be construed as limiting the scope of the invention in any manner. It should be understood that the above listed figures are not necessarily to scale and may include fragmentary views, graphic symbols, diagrammatic or schematic representations. Details that are not necessary for an understanding of the present invention by one skilled in the technology of the invention, or render other details difficult to perceive, may have been omitted.

DETAILED DESCRIPTION OF SPECIFIC EMBODIMENTS

The present invention can be incorporated into existing or new activated sludge wastewater treatment systems providing "enhanced biological phosphorus removal" (EBPR), improving settling of the activated sludge by providing selective pressure in favor of phosphorus accumulating organisms (PAOs) and against the growth of filamentous bacteria, improving total nitrogen removal, improving energy efficiency, and recovering alkalinity within the system.

Exemplary embodiments of a "method for improved biological phosphorous and nitrogen removal in activated sludge processing" or more simply referred to herein as the "process control method" 10 will be best understood by reference to the drawings included herewith, wherein like parts are designated by like numerals throughout. It will be readily understood that the components of the device, as generally described and illustrated in the figures herein, could be arranged and designed in a wide variety of different configurations. Thus, the following more detailed description of the embodiments of the apparatus, system, and method is not intended to limit the scope of the invention, as claimed, but is merely representative of exemplary embodiments of the technology.

Referring to FIGS. 4 through 7, the innovative process control method 10 of the present invention can be applied to new and existing oxidation ditch treatment process designs and other activated sludge process configurations to achieve EBPR and improved nitrogen removal. The term "oxidation ditch" is used for convenience in the description of the present invention herein, but it should be understood that the present invention can readily be applied using other activated sludge aeration basin geometries and configurations. The technical description of the innovations of the present invention will be provided here by way of example. However, it should be noted that other similar process configurations could be utilized in applying embodiments of the novel methods disclosed and described herein.

Figure 4:
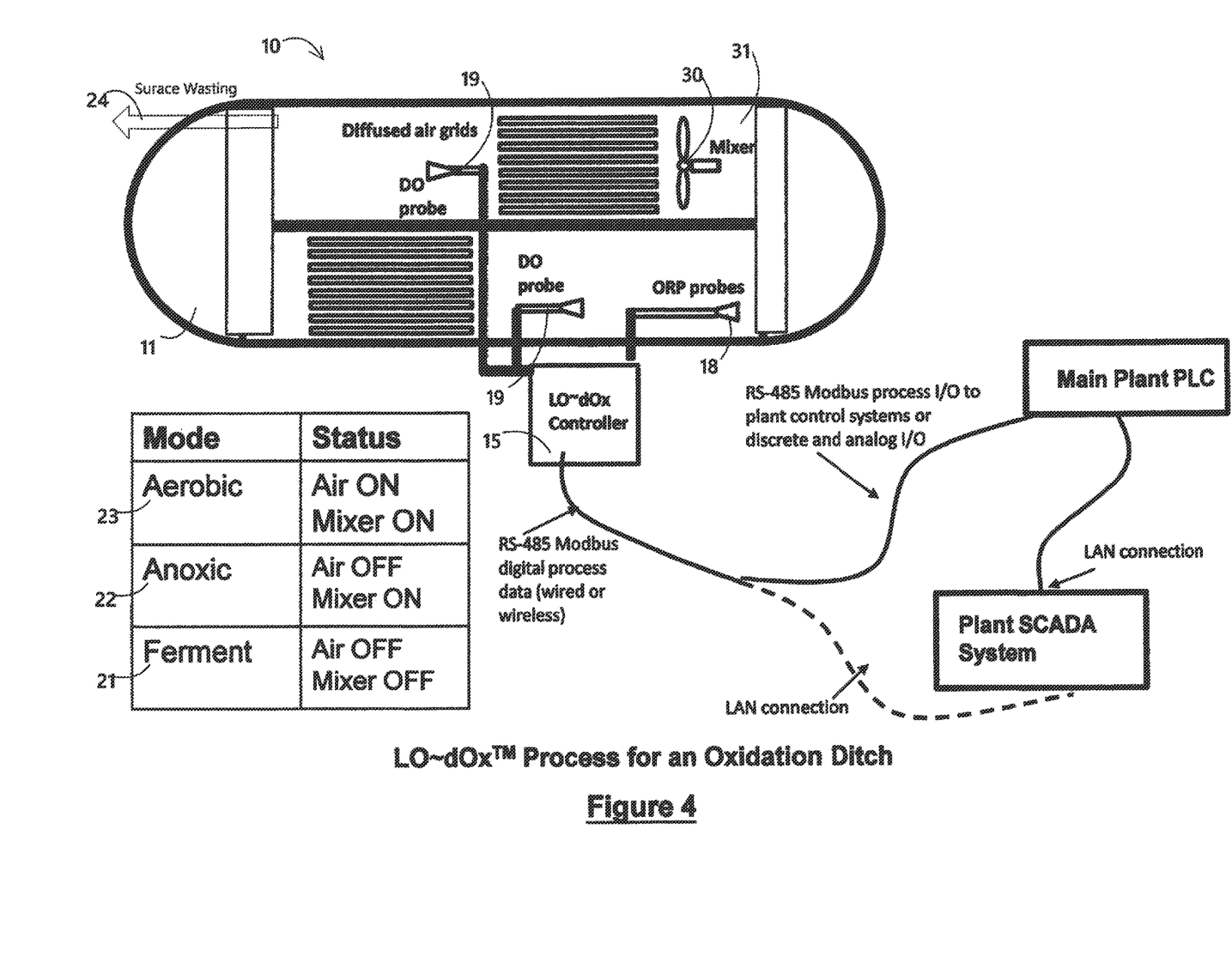
FIG. 4 shows a process schematic of a typical oxidation ditch treatment facility, additionally equipped with independent aeration and mixing as utilized in an embodiment of the present invention.

FIG. 4 shows a process schematic of a typical "oxidation ditch treatment facility" 11 or "oxidation ditch plant" additionally equipped with independent aeration and mixing, as applied with an embodiment of the process control method 10 of the present invention, as designed and installed under the "LO~dOx" brand of environmental control apparatus namely for water treatment purposes, by dTEC Systems L.L.C. of Seattle, WA.

Until recently, it was accepted that phosphorus could only be removed in conventional "enhanced biological phosphorus removal" (EBPR) plants when the wastewater characteristics were favorable with an rbCOD/TP ratio of more than fifteen to one. Earlier studies focused their discussion on *Ca*. Accumulibacter, which was abundant in conventional plants that relied on an external source of VFA and showed no ability to grow and take up phosphorus under anoxic conditions. However, there are more recent examples of non-conventional EBPR plants which perform very well in which the influent wastewater is discharged directly to the anoxic zone. In some cases, the only source of VFA was from the primary sludge fermenter or the VFA that was formed in the anaerobic zone by fermenting RAS.

One of the EBPR plants studied has a history of phosphorus uptake in the anoxic zone indicating that different PAOs that can take up phosphorus under anoxic conditions, such as Tetrasphaera, might be present. Another study propose that the only possible VFA source when fermenting mixed liquor, especially RAS, was from the fermentation of non-PAOs and that PAOs survived better by having a much lower decay rate under anaerobic conditions. Still another more recent study points to the possibility that with more prolonged and deeper anaerobic conditions, growth of other PAOs may be favored and their behavior may differ from that of the much researched Accumulibacter species found mostly in conventional biological nutrient removal (BNR) plants.

A possible answer may be that the "standard" configuration, where all the primary effluent is passed through the anaerobic zone with little regard to the flow rate or the wastewater characteristics, inadvertently favors the selection of species like Accumulibacter that need an external supply of VFA. Fermentation of RAS or mixed liquor has resulted in deeper anaerobic conditions such as indicated by an ORP as low as −300 mV, which allows for the growth of fermenting PAOs such as Tetrasphaera, which could produce additional VFA that would allow organisms such as Ca. Accumulibacter to grow alongside them.

Tetrasphaera encompasses a broad class of bacteria whose diversity has not been well characterized. Still, it is reported that there are unique traits that some in this class seem to share. All of them can ferment complex organic molecules such as carbohydrates and amino acids (including glucose, glutamate, aspartate), and produce stored carbon in the process. Some Tetrasphaera species can produce VFA (among other metabolites) during fermentation under reduced anaerobic conditions, which could be utilized as substrate by other PAOs. Further, most types of Tetrasphaera are able to denitrify and to couple nitrite/nitrate reduction with phosphorus uptake. Because of these behaviors, the net impact of Tetrasphaera on EBPR could be significant. What is typically modeled as fermentation of rbCOD to VFA would produce storage products to be used for phosphate uptake during anoxic and aerobic processing phases.

If this is the case, significantly more of the available carbon could be used for phosphate removal (i.e., for PAOs carbon storage rather than for growth of "other heterotrophic organisms" (OHOs). In a survey of a number of plants in Australia and Denmark, where the abundance of Tetrasphaera organisms was greater than Accumulibacter, which indicates that it may play a bigger role than has been accepted up to now. One conclusion is that Tetrasphaera seems to occupy a slightly different ecological niche compared with Ca. Accumulibacter, contributing to a functional redundancy and stability of the EBPR process.

Also, it has been shown that the probe-defined Tetrasphaera displays different morphologies and constituted up to 30% of the total biomass in five plants as studied. It was shown that active uptake of orthophosphate and formation of polyphosphate took place in most of these Tetrasphaera populations. Based on the review of currently available information it would appear that the most important parameter for optimal EBPR is that a diversity of PAOs must pass through a deep anaerobic zone defined by an ORP below a certain value. Evidence points to an inability of most conventional EBPR plants to reduce the ORP to below this value. Tentative measurements suggest that ORP values that are at or below about −300 mV are linked to the growth of organisms like Tetrasphaera that thrive under those conditions. Tetrasphaera can ferment higher carbon forms, take up phosphorus, and produce VFA, which can be used by other PAOs while also taking up phosphorus under anoxic conditions. Thus, the inability of most conventional EBPR plants to reduce the ORP to the low values which are needed does not allow Tetrasphaera to thrive.

The ability of Tetrasphaera to ferment higher carbon forms is particularly important for removal of phosphorus and nitrogen from wastewater which do not contain sufficient rbCOD and/or from communities in colder regions which will not contain higher concentrations of VFA by the time is gets to the treatment plants.

Figure 5:
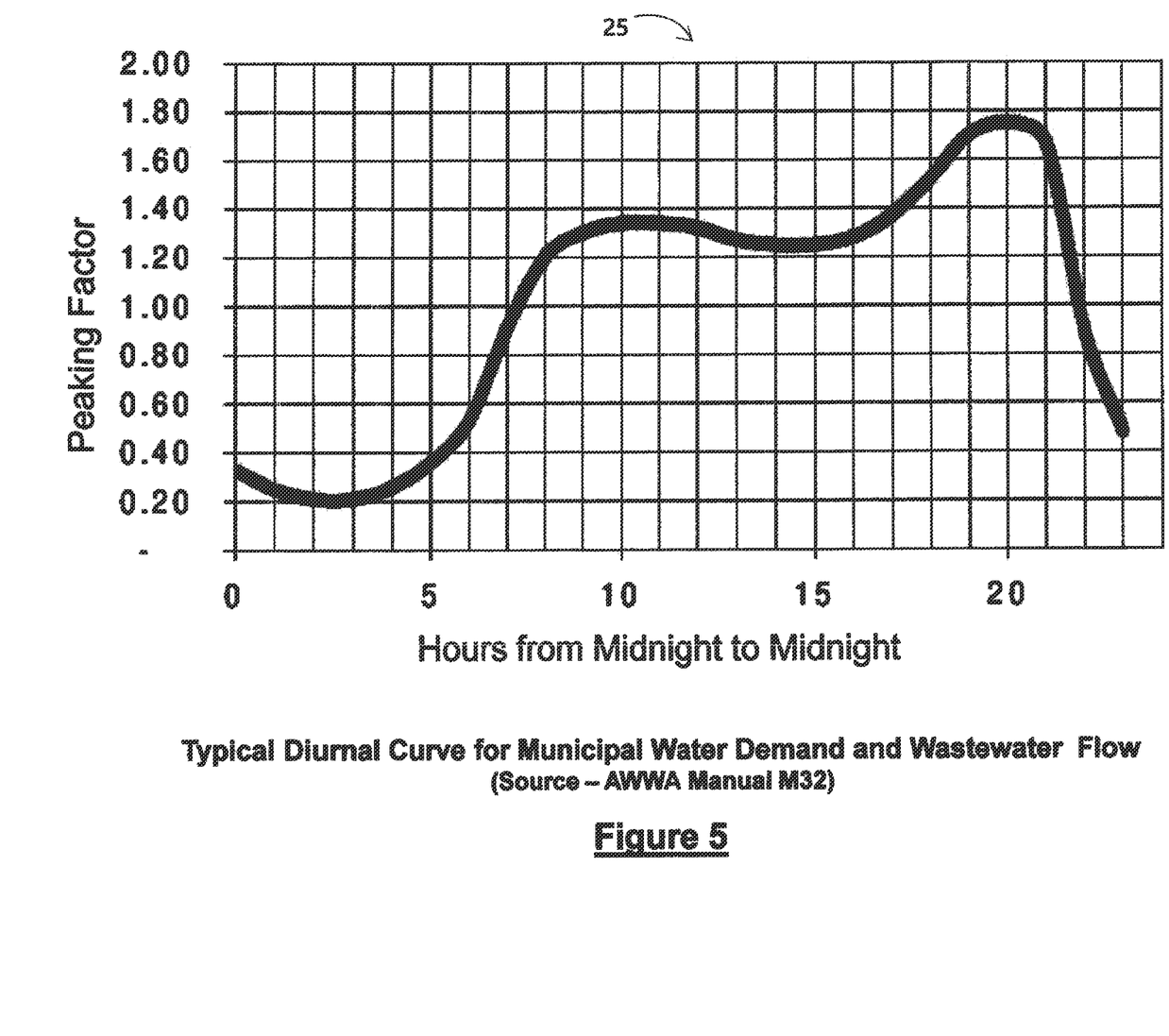
FIG. 5 is a typical diurnal loading curve for a small to medium-sized municipal wastewater treatment plant.

The typical oxidation ditch type of EBPR plant 11 also utilizes two or more secondary clarifiers to separate the mixed liquor from the treated effluent and provide for pumping of "return activated sludge" (RAS) to back to the oxidation ditch. Novel improvements to the conventional system are realized in providing the following key objectives:

1. A "deeply anaerobic fermentation period" (Ferment Period) 21 performed at least once in each 24-hour period, noting the terms "period" and "cycle" are employed herein interchangeably;
2. Employment of an "automated microprocessor control system" 15 using "oxidation-reduction potential" (ORP) monitored with one or more ORP probes 18, and "dissolved oxygen" (DO) monitored with one or more DO probes 19, and each employed as process variable inputs to automate subsequent "Aerated" or Aerobic Cycles 23, and subsequent Anoxic Cycles 22, to optimize phosphorus and nitrogen removal using the available carbon in the influent wastewater;
3. An energy efficient dynamic dissolved oxygen control during an Aerated or Aerobic Period 23;
4. A Surface Wasting 24 of excess activated sludge microorganisms during an Aerated Period 23;
5. The novel use of a quiescent period in which no mixing or aeration occurs, to provide a defined period of time where fermentation conditions in the settled activated sludge bed as defined by first the depletion of nitrate within the settled mixed liquor depth and then continue into the abovementioned Ferment Period 21, in which deeply anaerobic conditions are achieved, preferably where ORP values of −300 mV, or less are measured, followed by the resumption of mixing which will create an anoxic condition due to the presence of nitrate in the treated wastewater above the settled mixed liquor bed depth; and
6. Performing the Ferment Period 21 during the lowest influent flow and loading period, as indicated by a normal diurnal pattern for a wastewater treatment plant 25, as shown in FIG. 5. By implementing the Ferment Period 21 in this manner, which takes advantage of the lowest flow and loading period of the typical diurnal pattern, these fermentation conditions create the abovementioned benefits of a more diverse microbial population by promoting the selection for and growth of Tetrasphaera and other "denitrifying phosphate accumulating organisms" (dnPAOs).

In this way, the process control method 10 of the present invention can be implemented very cost-effectively and without the need for additional tankage or pumping systems. Likewise, external anaerobic and/or anoxic selector tanks, while they can be included, are not essential for phosphorus and nitrogen removal using the present invention. Where such external tanks do already exist, performance of the treatment plant is further improved by use of the methods of the present invention, in terms of phosphorus and nitrogen removal efficiency, a more efficient use of influent carbon, a reduced energy utilization requirements, and a greater resilience and reliability under varying influent flow and loading conditions.

The use of an external anaerobic tank ahead of parallel oxidation ditches was previously discussed in U.S. Pat. No. 8,568,592, but notably without the incorporation of a novel fermentation period and surface wasting of mixed liquor as disclosed in the present invention, without which a high level of efficiency and resilience of phosphorus and nitrogen removal over varying influent conditions cannot be achieved.

Specific steps of preferred embodiments of the method of the present invention include some or all of the following elements:

1. The incorporation of one or more Ferment Periods 21 within each oxidation ditch 11 preferably coinciding with the lowest flow and loading period (or periods) during each 24-hour period to allow for fermentation conditions to develop within the settled mixed liquor bed where fermentation conditions can be monitored and controlled using ORP measurements in the settled mixed liquor. Fermentation conditions are characterized by having an ORP of less than −200 mV and preferably −300 mV or less for a substantial portion of the fermentation period as previously described.

2. A means of introducing influent wastewater into the oxidation ditch in a location and manner to prevent short circuiting of influent wastewater between the influent and effluent conveyances during the fermentation period in which both aerated and mixing have been stopped.

3. A means of independently aerating and mixing the entire oxidation ditch reactor where the preferred method of aeration utilizes fine bubble diffusers located in the lower portion of the tank although the present invention would not preclude the use of surface aerators, jet aerators or other equivalent means of introducing oxygen into the reactor independently of mixing.

4. A means of withdrawing a portion of the mixed liquor suspended solids from the surface of the tank in an automated manner to control the rate of withdrawal, the volume of withdrawal, and the depth of the flow over the withdrawal device while the mixed liquor is maintained in suspension using the aeration system.

5. A means of withdrawing mixed liquor from the oxidation ditch for conveyance to a clarifier or clarifiers for separating treated effluent from the return activated sludge.

6. A means of automatically adjusting the depth of liquid in the aeration basin such that the flow of mixed liquor out of the basin can be reduced or eliminated during the fermentation periods in order to further improve phosphorus and nitrogen removal efficiency and in order to allow for increasing the duration of the fermentation period where necessary to optimize overall performance in achieving the process improvements described herein.

Figure 6:
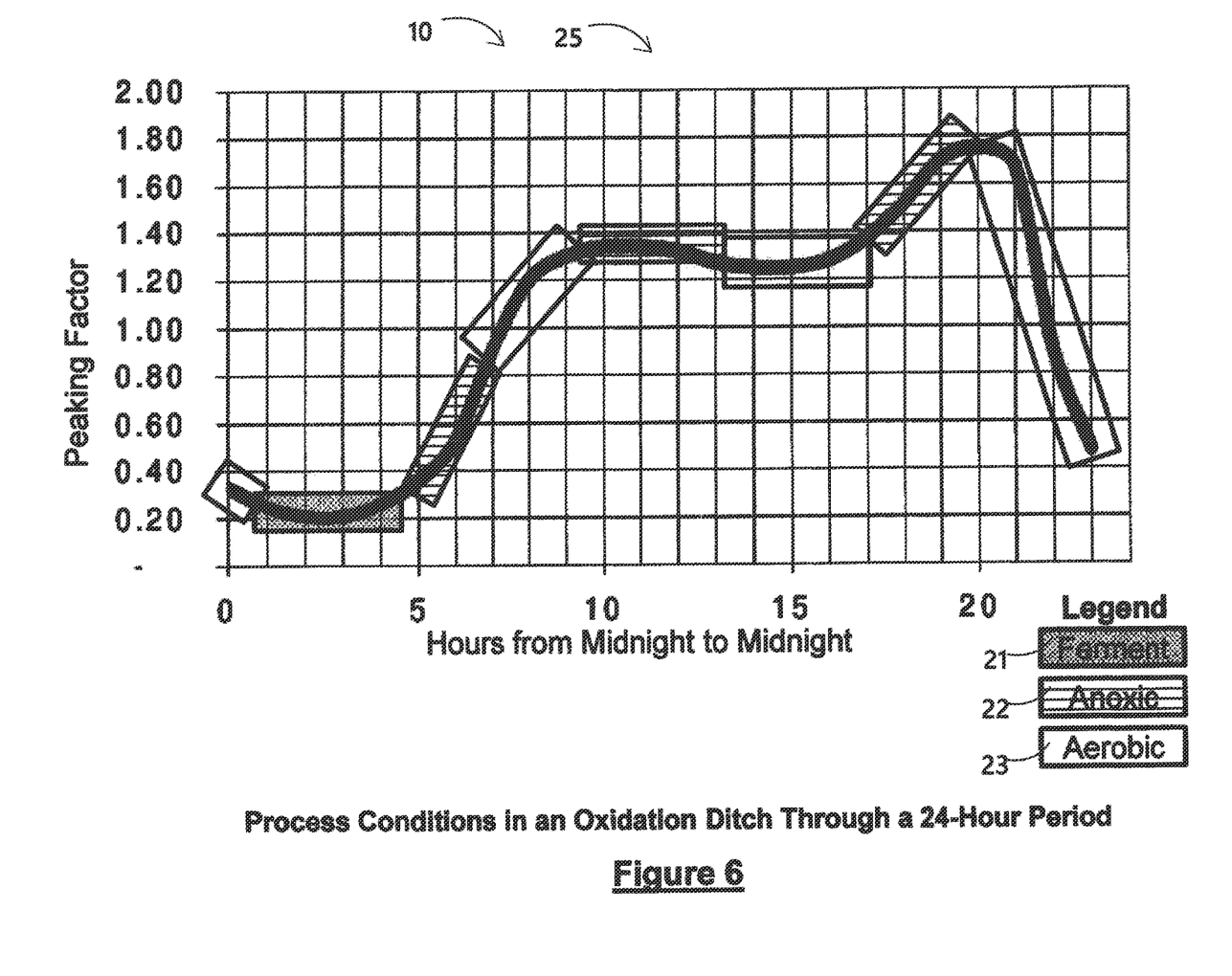
FIG. 6 depicts a sequence of cycles over a period of twenty-four hours in an oxidation ditch design incorporating an embodiment of the present invention.

FIG. 6 depicts a typical sequence of cycles over a period of twenty-four hours in an oxidation ditch design incorporating the method of the present invention. Such a sequence of operating conditions in the ditch will achieve enhanced biological phosphorus removal while maximizing the growth of dnPAOs over PAOs to maximize nitrogen removal with the available carbon in the wastewater.

Figure 7:
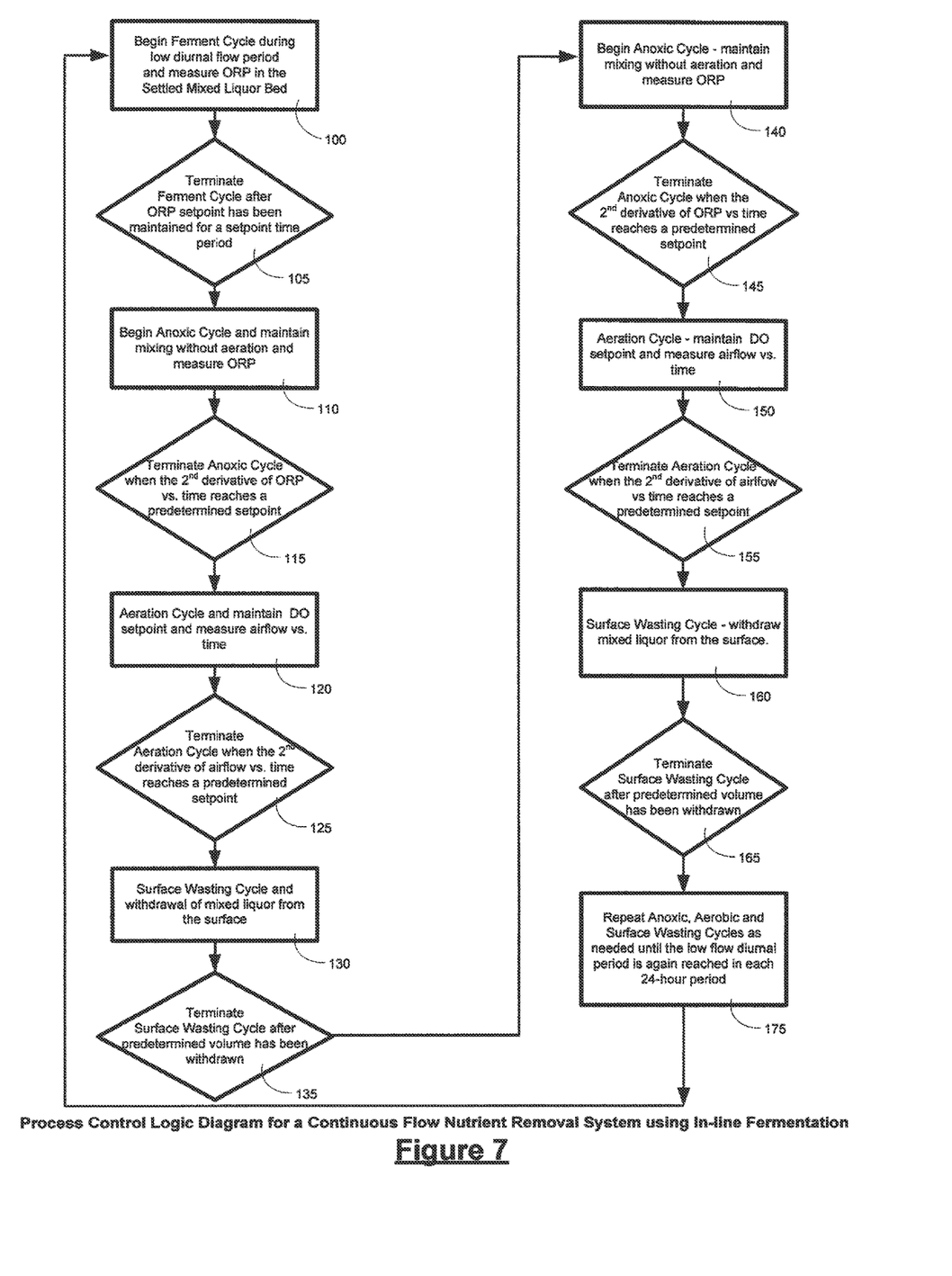
FIG. 7 is a process control logic diagram for a continuous flow nutrient removal system using in-line fermentation, according to an embodiment of the present invention.

The following paragraphs describe the dynamic process control methodologies to be incorporated into the present invention for each of the cycles in the oxidation ditch, as shown in FIG. 7:

Ferment Period 21 (Anaerobic Conditions with the settled mixed liquor bed)—For a period of time normally coinciding with the lowest flow and loading period(s) of the typical diurnal curve for the influent wastewater, both the aeration and mixing systems are turned off creating quiescent conditions in which the mixed liquor suspended solids in the oxidation ditch settle to the bottom of the reactor. The ORP will be monitored within the settled bed of mixed liquor.

The preferred process control method 10 starts with beginning a ferment cycle for the duration of the Ferment Period 21 during this low diurnal flow period in the settled mixed liquor bed, along with measurement of the ORP of the sludge wastewater 100. In this preferred embodiment of the present invention, the ORP will reach a value of −300 mv or less within the settled mixed liquor bed 31 for a period of at least two hours although the duration of the Ferment Period could be longer or shorter than two hours depending on local conditions and site specific wastewater characteristics, and process objectives, storm flow events, or other factors.

The deeply anaerobic conditions taking place during the Ferment Period 21 allow for fermentation of various substrates and for uptake of VFA by PAOs and including dnPAOs such as Tetrasphaera, to support EBPR in each subsequent Anoxic Period 22, and Aerobic Period 23. The Ferment Period can be automatically terminated based on the time of day, based on a selected period of time in which the ORP has remained at or below a setpoint value, such as −300 mv for example, or based on the influent wastewater flow rate, or based upon a combination of these factors and variables.

The Ferment Cycle 21 is terminated after an ORP setpoint has been maintained for a ferment cycle ORP setpoint time period 105. Preferably, the ORP setpoint is less than −200 mV, and the ORP setpoint time period is preferably greater than approximately two hours.

First Anoxic Cycle 22 (immediately following the Ferment Period)—in this cycle mixing of the aeration basin is commenced without aeration. Nitrate will normally present in the clear liquid above the settled mixed liquor bed in the Ferment Period from the Aerated or Aerobic Cycle 23, which immediately precedes the Ferment Period thereby creating anoxic conditions in the First Anoxic Cycle. ORP is continually monitored and logged by the microprocessor-based control system.

This beginning of the First Anoxic Cycle 23 of the sludge wastewater includes maintaining mixing of the sludge wastewater without aeration, and also includes measurement of a first anoxic cycle ORP of the sludge wastewater 110.

When substantially all of the nitrate and nitrite nitrogen which remains from the previous Aerated Cycle 23 has been denitrified, there will be a change in the rate of change in the ORP versus time curve which can be used to determine when substantially all of the nitrate and nitrite present has been denitrified. When the microprocessor-based control system 15 detects this inflection point in the rate of change in ORP versus time, the First Anoxic Cycle 22 will be terminated, and aeration will commence thereby creating an Aerated Cycle.

In this next step of the preferred process control method 10 according to an embodiment of the invention, the first Anoxic Cycle 22 terminates when a first anoxic second derivative of the ORP versus an elapsed first anoxic cycle time reaches a predetermined first anoxic derivative setpoint 115. However, the detection of nitrate depletion using the rate of change in the measured ORP value is considered prior art, as described in U.S. Pat. No. 5,582,734.

Aerated Cycle 23—in this cycle, which may be referred to herein as the Aeration Cycle or the Aerobic Cycle, aeration is maintained with air flow regulated to maintain a selected low-range DO setpoint, at 0.5 mg/L to 1.5 mg/L, for example. The air flow rate is continually monitored and logged by the microprocessor-based control system 15.

This beginning of a first Aeration Cycle 23 with a first aeration of the sludge wastewater, includes and maintaining a first aeration DO setpoint measured in the sludge wastewater and measure a first aeration airflow versus an elapsed first aeration cycle time 120.

When substantially all of the built-up ammonia nitrogen in the Oxidation Ditch 11 has been oxidized to nitrite or nitrate, there will be a significant drop in the air flow rate required to maintain the selected DO setpoint. When the microprocessor-based control system 15 detects this inflection point in the rate of air versus time, the Aerated Cycle 23 will be automatically terminated after an operator adjustable time delay.

Specifically, terminating the first Aeration Cycle preferably occurs when a first aeration second derivative of said first aeration airflow versus the elapsed first aeration cycle time reaches the predetermined first aeration setpoint 125.

Surface Wasting 24 during Aerated Cycles 23—during one or more of the Aerated Cycles, a specific volume of mixed liquor will be withdrawn from the surface of the reactor and wasted from the system. This Surface Wasting period would be initiated sometime after the beginning, but before the end of an Aerated Cycle. Surface Wasting will preferably be initiated at least once per day in each aeration basin. Waste activated sludge withdrawn by surface wasting would be further processed by gravity or mechanical thickening followed by digestion. Alternatively, it could undergo fermentation for release and recovery of phosphorus and/or conditioning of a portion of the waste activated sludge for return to the aeration basin. It is anticipated that the implementation of the Ferment Period 21 together with a control system 15 operating in the manner described will provide strong selective pressure to favor the growth of dnPAOs.

In this next step of the preferred process control method 10 according to an embodiment of the invention a first Surface Wasting Cycle 24 initiates with a first withdrawal of the mixed liquor from the surface of the settled mixed liquor bed 130. Additionally, the first Surface Wasting Cycle terminates after a first predetermined volume of the mixed liquor has been withdrawn from said surface of the settled mixed liquor bed 135.

Anoxic Cycle 22—At the termination of the Aerated Cycle 23, mixing without aeration begins thereby creates another Anoxic Cycle. When the microprocessor-based control system 15 detects this inflection point in the rate of change in ORP versus time corresponding to the depletion of nitrate and nitrite, the Anoxic Cycle will automatically terminate, and another Aerated Cycle will begin.

The beginning of the second Anoxic Cycle 22 of the sludge wastewater includes maintaining mixing without aeration, and with a measurement a second anoxic cycle ORP of the sludge wastewater 140. Termination of this second Anoxic Cycle occurs when a second anoxic second derivative of the ORP versus an elapsed second anoxic cycle time reaches a predetermined second anoxic derivative setpoint 145.

Beginning a second Aeration Cycle 23 with a second aeration of the sludge wastewater also includes maintaining a second aeration DO setpoint measured in the sludge wastewater and measuring a second aeration airflow versus an elapsed second Aeration Cycle 150.

The second Aeration Cycle 23 terminates when a second aeration second derivative of the second aeration airflow versus the elapsed second aeration cycle time reaches a predetermined second aeration setpoint 155.

Most preferably, a second Surface Wasting Cycle 24 is then initiated with a second withdrawal of the mixed liquor from a surface of the settled mixed liquor bed 160.

The second Surface Wasting Cycle 24 is terminated after a second predetermined volume of the mixed liquor has been withdrawn from the surface of the settled mixed liquor bed 165.

A preferred method of the present invention automatically alternates between anoxic cycles and aerated cycles in this above described manner until a Ferment Cycle 21 begins again. The repeating of the Anoxic Cycle 22, followed by the Aerobic Cycles 23 and Surface Wasting Cycles 24 is preferably performed as needed, until the above described low flow diurnal period is again reached in each 24-hour period of operation 175.

As previously noted, the method of the invention provides the efficient utilization of the available organic carbon in the sludge wastewater to maximize both P removal and N removal, while at the same time achieving significant energy savings.

Further energy savings will be realized as compared to the modified Bardenpho and similar processes, since no internal recycle pumping is necessary. Bacterial species identification and quantification using standard "quantitative polymerase chain reaction" (q-PCR) methods, can be used to verify and optimize the process control logic model and control algorithms. The application of the present invention the development of activated sludge bacteria consortia with high settling velocities and which enable energy efficient N and P removal in smaller reactor tanks. In doing so, the process control method 10 of the present invention will also effectively increase the capacities of the aeration basins and clarifiers in existing treatment plants.

Figure 1:
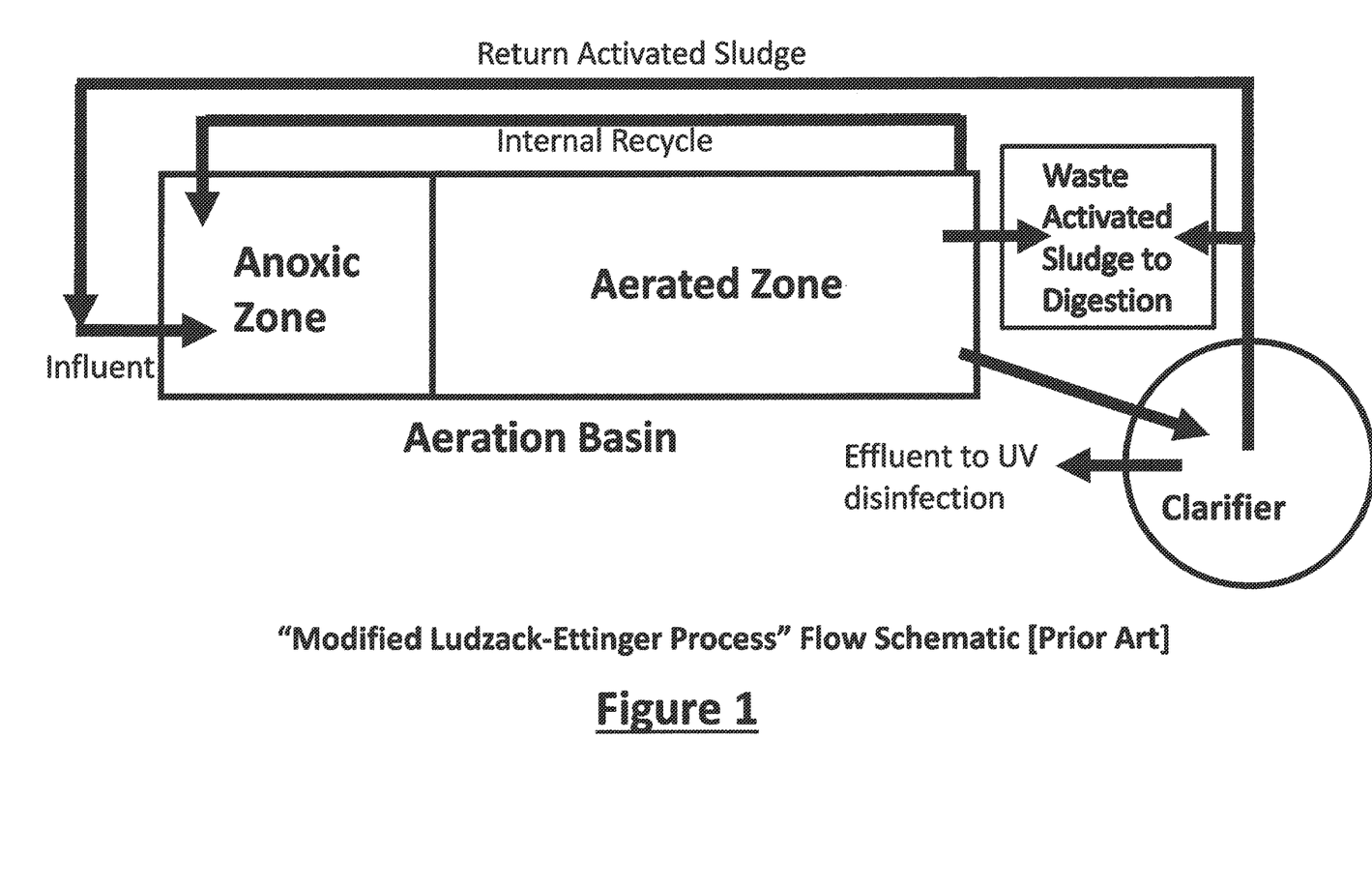
FIG. 1 is a prior art schematic diagram of the "Modified Ludzack-Ettinger Process" for nitrogen removal using the activated sludge process.
Figure 2:
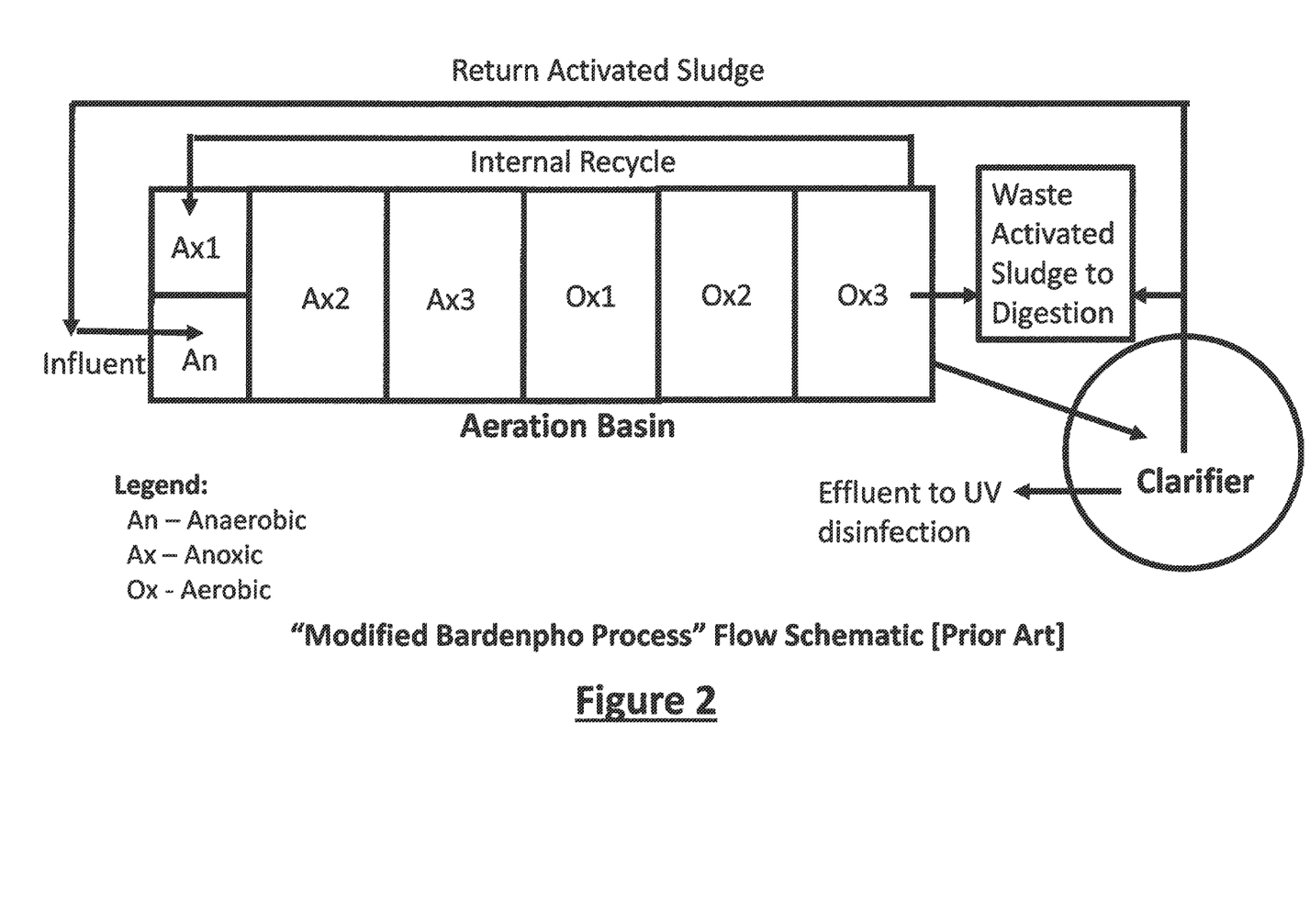
FIG. 2 is a prior art schematic diagram of the "Modified Bardenpho Process" for enhanced biological phosphorus removal and nitrogen removal using the activated sludge process.

Many conventional activated sludge systems, as shown in FIGS. 1 and 2, can be improved to incorporate the present invention, to realize similar benefits as those described herein. Because of the conservative design parameters typically used in oxidation ditch and other extended aeration activated sludge systems, the present invention will substantially increase the flow and organic loading capacity of these systems by dramatically improving the settling properties of the activated sludge mixed liquor as further described herein.

The typical oxidation ditch treatment facility retrofitted with independent aeration and mixing, applied according to an embodiment of the process control method 10 of the present invention can achieve high levels of phosphorus and nitrogen removal, excellent SVI control, efficient use of the carbon in the influent wastewater needed to accomplish nutrient removal, energy savings, and alkalinity recovery under variable wastewater loading conditions by modifying the design and operation of the conventional continuous flow oxidation ditch systems and other similar activated sludge systems. The process incorporates a mixer 30 in the oxidation ditch (or other aeration basin design) which enables independent aeration and mixing, together with an operation and control strategy which maximizes the assimilation of influent "biochemical oxygen demand" (BOD) and "total volatile fatty acids" (VFAs) by PAOs, and particularly by dnPAOs.

The addition of the mixer 30, as shown in FIG. 4, allows the "ditch" 31 (or aeration basin) of the oxidation ditch treatment facility 11 to be mixed with the aeration off, thereby making the entire tank anoxic when the mixer is on and the aeration is off. Preferred methods and embodiments of the present invention further allows for the creation of anaerobic conditions and fermentation within the settled mixed liquor during selected intervals within each twenty-four hour period by turning off both aeration and mixing. The periods of fermentation conditions, thereby created help to select for PAOs within the microbial communities which make up the mixed liquor and for dnPAOs, in particular.

The control of each Anoxic Cycle 22, Aerobic Cycle 23, and Anaerobic/Fermentation Cycle 21 frequency and duration during a given 24-hour period must be done in a manner that maximizes the assimilation of BOD and VFAs by dnPAOs. This control can be done with detailed information on the diurnal loading variations, and with an automatic microprocessor-based control system 15, using on-line ORP, DO, and influent flow rates as process variable inputs. Where diffused aeration grids and horizontal flow mixers are utilized for aeration and mixing, the process of the present invention can also allow for varying the volume of the aeration basin by means of an adjustable automated overflow weir. In this manner, the discharge of mixed liquor from the aeration basin during the Fermentation Period which would normally be set to coincide with the period of lowest diurnal flow and loading conditions, typically the middle of the night and early morning hours, can be reduced or eliminated thereby further improving treatment efficiency and allowing for the use of longer Fermentations Periods as may be necessary to optimize the removal of phosphorus and nitrogen from the wastewater.

For this Detailed Description of Specific Embodiments, the terms "connected", "attached", "coupled" and "mounted" refer to any form of interaction between two or more elements, including mechanical, electrical, magnetic, electromagnetic, fluid, and thermal interaction. Two components may be functionally coupled with or to each other, even though they are not in direct contact with each other.

Also, the terms "approximately" or "approximate" are employed herein throughout, including this detailed description and the attached claims, with the understanding that is denotes a level of exactitude commensurate with the skill and precision typical for the particular field of endeavor, as applicable.

Additionally, the terminology used in this Detailed Description of Specific Embodiments is to be interpreted according to ordinary and customary usage in the field of the invention as exemplified in the pertinent U.S. and International Patent Classification Codes, and equivalent codes in other patent classification systems.

The word "embodiment" is used herein to mean "serving as an example, instance, or illustration." Any embodiment described herein is not necessarily to be construed as preferred or advantageous over other embodiments. While the various aspects of the embodiments are presented in drawings, the drawings are not necessarily drawn to scale.

Additionally, reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that the above Detailed Description of Specific Embodiments includes the referenced figures and following claims, and is more simply referred to herein as the "description" or the "disclosure". In this description, various features are sometimes grouped together in a single embodiment, figure, or written explanation thereof for the purpose of streamlining this disclosure. However, this method of disclosure is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this description are hereby expressly incorporated into this description and disclosure, with each claim standing on its own as a separate embodiment. This description includes all permutations of the independent claims with their dependent claims.

In compliance with the statutes, the invention has been described in language more or less specific as to structural features and process steps where applicable. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible, which employ the same inventive concepts as described above. Therefore, the invention is not to be limited except by the following claims, as appropriately interpreted in accordance with the doctrine of equivalents.

What is claimed is:

1. A method for removing phosphorus and nitrogen from an activated sludge wastewater treatment system, said method comprising the steps of:

a) treating a phosphorus and nitrogen-containing wastewater in at an activated sludge reactor configured for continuous flow that includes an aeration and a mixing of said wastewater, when during a time interval in a twenty-four hour period aeration and mixing is stopped to achieve
an anaerobic or fermentation condition in the activated sludge reactor in a settled state, the anaerobic or fermentation condition indicated by an oxidation-reduction potential value of less than −200 mV for a fermentation period of at least two hours in a 24-hour period;

b) treating the phosphorus and nitrogen-containing wastewater immediately following said fermentation period, with resuming the mixing of the activated sludge reactor contents without aeration to create anoxic conditions utilizing nitrate in solution in a clarified liquid in place above a settled mixed liquor bed in the activated sludge reactor during the fermentation period, and with the mixing under anoxic conditions for an anoxic period, said anoxic period continuing until a depletion of nitrate is detected using a nitrate depletion control algorithm with a derivative of a rate of change in oxygen-reduction potential versus time used as process variable inputs for the nitrate depletion control algorithm;

c) treating said wastewater in the activated sludge reactor following said anoxic period, by resuming the mixing and aeration and maintaining a constant concentration of a dissolved oxygen at a selected concentration of the dissolved oxygen during an aerated period by controlling an input of an air flow volume with a measured value of the dissolved oxygen in the activated sludge reactor contents used as process variable inputs for controlling the input of the air flow volume;
d) determining when a derivative of rate of change of the air flow volume into the activated sludge reactor needed to maintain said selected concentration of the dissolved oxygen reaches a predetermined value indicating that conversion of an ammonia nitrogen in the wastewater to a nitrite or a nitrate is complete and thereby initiating programmable time delay period prior to ceasing aeration and beginning of a subsequent anoxic period;
e) alternating the subsequent anoxic period and a subsequent aerated period with an anoxic-aerated control algorithm, until a time of the fermentation period as subsequently scheduled;
f) withdrawing during one or more of said subsequent aerated period, a volume of mixed liquor from a surface of the activated sludge reactor, and the volume of the mixed liquor wasted from the activated sludge reactor; and
g) maximizing utilization of a stored organic carbon substrate in phosphate accumulating organisms under anoxic conditions, and thereby a selection of denitrifying phosphate accumulating organisms over non-denitrifying phosphate accumulating organisms is also maximized in order to further maximize the removal of phosphorus and nitrogen in the activated sludge reactor.

2. The method of claim 1, wherein said anaerobic or fermentation condition is indicated by an oxygen-reduction potential value of less than −300 mV for said fermentation period of at least two hours in each 24-hour period.

3. The method of claim 1, wherein during said aerated period, a low-range dissolved oxygen setpoint in a range of 0.5 mg/L to 1.5 mg/L is maintained by a regulation of an air flow into the activated sludge reactor.

4. The method of claim 1, wherein before the end of said aerated period, a flow rate of air to an aeration diffuser array maintains a dissolved oxygen level at or proximate to a minimum measured value of the dissolved oxygen level.

5. The method of claim 1, including additional steps of:
h) stopping aeration during the time interval in said twenty-four hour period; and
i) stopping mixing during the time interval in said twenty-four hour period, the stopping of aeration and stopping of mixing to achieve said anaerobic or fermentation conditions in a settled activated sludge, coinciding with a lowest flow and loading period as indicated by a typical diurnal curve for a waste water treatment plant.

6. The method of claim 5, wherein the steps of the stopping of aeration and stopping mixing to achieve said anaerobic or fermentation conditions in the settled activated sludge is indicated by an oxygen-reduction potential value of less than −300 mV for the fermentation period of at least two hours in the twenty-four hour period.

7. The method of claim 1, including additional steps of:
h) controlling the operational sequencing and control of said fermentation period, said anoxic period, said aerated period, and a surface wasting period with a microprocessor-based monitoring and control system; i) determining a derivative set of values of the oxygen-reduction potential values versus time and a point at which the derivative set of values of the oxygen-reduction potential values versus time indicates that most of the nitrate or nitrite in the mixed liquor has been denitrified thereby ending said anoxic period with said microprocessor-based monitoring and control system; j) determining the derivative set of values of the air flow input rate versus time and the point at which the derivative set of values indicates that most of the ammonia nitrogen in the wastewater has been converted to a nitrate or to a nitrite, and thereby ending said aeration period with said microprocessor-based monitoring and control system; and
k) maximizing the utilization of the stored organic carbon substrate in phosphate accumulating organisms under anoxic conditions, and thereby enhancement of the selection of denitrifying phosphate accumulating organisms over non-denitrifying phosphate accumulating organisms is maximized in order to further maximize the removal of phosphorus and nitrogen in the activated sludge wastewater treatment system using available carbon in the wastewater with said microprocessor-based monitoring and control system.

8. The method of claim 1, wherein said activated sludge wastewater treatment system is a multi-stage plug flow activated sludge system, the multi-stage plug flow activated sludge system is utilized and including additional steps of:
h) mixing within the multi-stage plug flow activated sludge system is ceased within one or more of an anaerobic zone at least once per twenty-four hour period to create fermentation conditions in the anaerobic zone to coincide with an anaerobic low flow value and an anaerobic loading period, said anaerobic loading period as indicated by a typical diurnal curve as specific for a wastewater treatment plant; and i) mixing within the multi-stage plug flow activated sludge system is ceased within one or more of an anoxic zone at least once per twenty-four hour period to create fermentation conditions in the anoxic zone to coincide with an anoxic low flow value and an anoxic loading period, said anoxic loading period as indicated by the typical diurnal curve as specific for said wastewater treatment plant.

9. The method of claim 1, wherein the step of withdrawing during the one or more of said subsequent aerated periods, the volume of the mixed liquor from the surface of the activated sludge reactor mixed additionally includes the steps of:
h) withdrawing said volume of the mixed liquor from a clarifier; and
i) transferring the volume of the mixed liquor to a second tank for gravity settling and holding the volume of mixed liquor in the second tank for a period of several hours to several days under fermentation conditions, thereby effecting a release of an orthophosphate to a bulk liquid, in which said bulk liquid is further processed to recover phosphorus as a fertilizer product.

10. The method of claim 9, wherein the step of withdrawing during the one or more of said subsequent aerated periods, the volume of the mixed liquor from the surface of the activated sludge reactor mixed additionally includes returning a portion of the bulk liquid to an aeration basin of the activated sludge reactor.

11. The method of claim 9, wherein the step of withdrawing during the one or more of said subsequent aerated periods, the volume of the mixed liquor from the surface of the activated sludge reactor mixed additionally includes transferring a portion of the bulk liquid to a digestion tank for further treatment and disposal.

12. The method of claim 1, wherein said activated sludge wastewater treatment system is two or more aeration basins operating in a parallel configuration.

13. The method of claim 1, wherein a duration of said fermentation period is determined by monitoring a period of time at which a measured oxygen-reduction potential value is at or below a predetermined value and automatically terminating the fermentation period when said period of time at or below a predetermine value reaches a predetermined setpoint duration.

14. The method of claim 1, wherein said activated sludge wastewater treatment system comprises of one or more tanks operated as a continuous flow activated sludge reactor.

15. A method for removing phosphorus and nitrogen from an activated sludge wastewater treatment system, said method comprising the steps of: a) beginning a ferment cycle of a sludge wastewater during a low diurnal flow period in a settled mixed liquor bed, and with a measurement of a ratio of oxidants to reductants as an electric potential to provide an ORP of the sludge wastewater in the settled mixed liquor bed; b) terminating the ferment cycle after an ORP setpoint has been maintained for a ferment cycle ORP setpoint time period, said ORP setpoint less than −200 mV, and said ORP setpoint time period greater than two hours; c) beginning a first anoxic cycle of the sludge wastewater and maintain mixing without aeration, and with a measurement a first anoxic cycle ORP of the sludge wastewater; d) terminating said first anoxic cycle when a first anoxic second derivative of the ORP versus an elapsed first anoxic cycle time reaches a predetermined first anoxic derivative setpoint; e) beginning a first aeration cycle with a first aeration of the sludge wastewater and maintaining a first aeration dissolved oxygen setpoint measured in the sludge wastewater and measure a first aeration airflow versus an elapsed first aeration cycle time; f) terminating said first aeration cycle when a first aeration second derivative of said first aeration airflow versus the elapsed first aeration cycle time reaches a predetermined first aeration setpoint; g) initiating a first surface wasting cycle with a first withdrawal of a mixed liquor from a surface while the mixed liquor is being aerated; h) terminating said first surface wasting cycle after a first predetermined volume of the mixed liquor has been withdrawn from said surface of a aerated mixed liquor bed; i) beginning an second anoxic cycle of the sludge wastewater and maintain mixing without aeration, and with a measurement a second anoxic cycle ORP of the activated sludge reactor; j) terminating said second anoxic cycle when a second anoxic second derivative of the ORP versus an elapsed second anoxic cycle time reaches a predetermined second anoxic derivative setpoint; k) beginning a second aeration cycle with a second aeration of the sludge wastewater and maintain a second aeration dissolved oxygen setpoint measured in the activated sludge reactor and measuring a second aeration airflow versus an elapsed second aeration cycle;

l) terminating said second aeration cycle when a second aeration second derivative of said second aeration airflow versus the elapsed second aeration cycle time reaches a predetermined second aeration setpoint; m) initiating a second surface wasting cycle with a second withdrawal of the mixed liquor from said surface of the aerated mixed liquor bed; and n) terminating said second surface wasting cycle after a second predetermined volume of the mixed liquor has been withdrawn from said surface of the aerated mixed liquor bed.

16. The method of claim 15, including additional step of: o) repeating an anoxic cycle followed by an aerobic cycle, and followed by a surface wasting cycle until the low diurnal flow period is reached in a twenty-four hour period.

* * * * *